B. T. ANDRÉN.
DENTAL INSTRUMENT.
APPLICATION FILED MAR. 29, 1913.
1,091,789.
Patented Mar. 31, 1914.
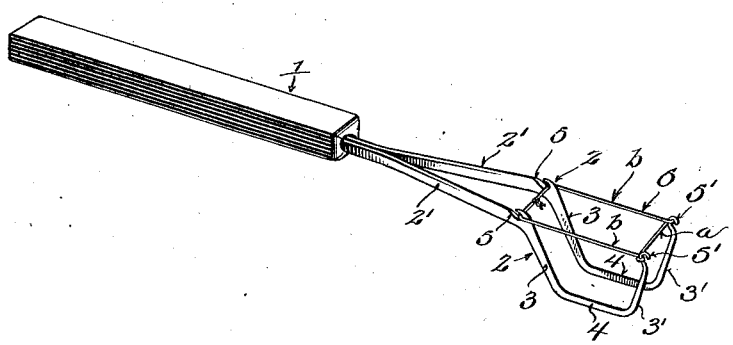

UNITED STATES PATENT OFFICE.

BIRGER T. ANDRÉN, OF MILWAUKEE, WISCONSIN.

DENTAL INSTRUMENT.

1,091,789.      Specification of Letters Patent.      Patented Mar. 31, 1914.

Application filed March 29, 1913. Serial No. 757,544.

*To all whom it may concern:*

Be it known that I, BIRGER T. ANDRÉN, a subject of the King of Sweden, and resident of Milwaukee, in the county of Milwaukee and State of Wisconsin, have invented certain new and useful Improvements in Dental Instruments; and I do hereby declare that the following is a full, clear, and exact description thereof.

The object of my invention is to provide an economical, effective and sanitary dental instrument for convenient use in cleaning between the teeth or in cleaning or burnishing the juxtaposed surfaces thereof, the construction and arrangement being such that a simple form of holder for a detachable strand is provided, which strand is held under tension to effect the desired result.

With the above object in view the invention consists in certain peculiarities of construction and combination of parts as hereinafter set forth with reference to the accompanying drawings and subsequently claimed.

The drawing represents a perspective view of a strand-holder embodying the features of my invention, a strand being shown positioned thereon.

Referring by characters to the drawings, 1 represents any style of handle for the support of a fork, the same comprising a pair of spring tang-members 2, which members are spaced apart as shown. Each tang member is provided with a straight stem portion 2' that terminates with an intermediate offset leg 3, which leg is merged into a base stretch 4 and from said base-section there is extended a terminal leg 3'. This leg 3' terminates approximately in line with the stem portions 2, the said legs and base-section together forming a U-shaped loop at the fork terminals. The knee joint, at the intersecting point of the intermediate legs 3 and stem 2 of each tang member, is provided with a strand-gripping slot 5 and the end terminal leg 3' of each tang is also provided with a strand-gripping head 5', the same being shown in the form of hooks, but it is understood that any convenient type of grip may be utilized as a substitute for said hooks. These strand gripping members are adapted to receive a looped strand 6, which strand is fitted into the gripping slots 5 and held by frictional engagement therein. The looped strand is also twisted once around each of the gripping heads 5' to thus prevent the said strand from movement incidental to a cleaning operation. It is understood that when the looped strand is to be adjusted to the fork tangs, the same are pressed together and thereafter when freed their expansive force tends to draw all of the stretches taut. Hence it will be seen that the strand is formed into opposite pairs of parallel stretches, the outer transverse stretch *a* being particularly adapted for working between the jaw teeth, while the longitudinal stretches *b* are positioned more accessible for cleaning between the front teeth, although the stretches may be used indiscriminately at the discretion of the operator.

It is apparent that in the operation the instrument is inserted and may be actuated in the same manner as that employed in manipulating a tooth-brush, whereby the small crevices between the teeth are thoroughly cleansed through a vibratory movement which will cause a stretch of the strand to be drawn back and forth between the pair of selected teeth.

I claim:

A dental instrument comprising a handle having a pair of normally spread spring tangs extending therefrom each of which tangs is merged into a U-shaped terminal, a gripping member in connection with the free end of each terminal, a gripping member formed at the junction of each U-shaped terminal and its tang, and a looped thread fitted about the pairs of gripping members to form three stretches, all of which stretches are under common spring tension whereby they are each held taut.

In testimony that I claim the foregoing I have hereunto set my hand at Milwaukee in the county of Milwaukee and State of Wisconsin, in the presence of two witnesses.

BIRGER T. ANDRÉN.

Witnesses:
    GEO. W. YOUNG,
    M. E. DOWNEY.